R. TOMLINSON.
Thrashing Machine.
No. 4,594.
Patented June 27, 1846.
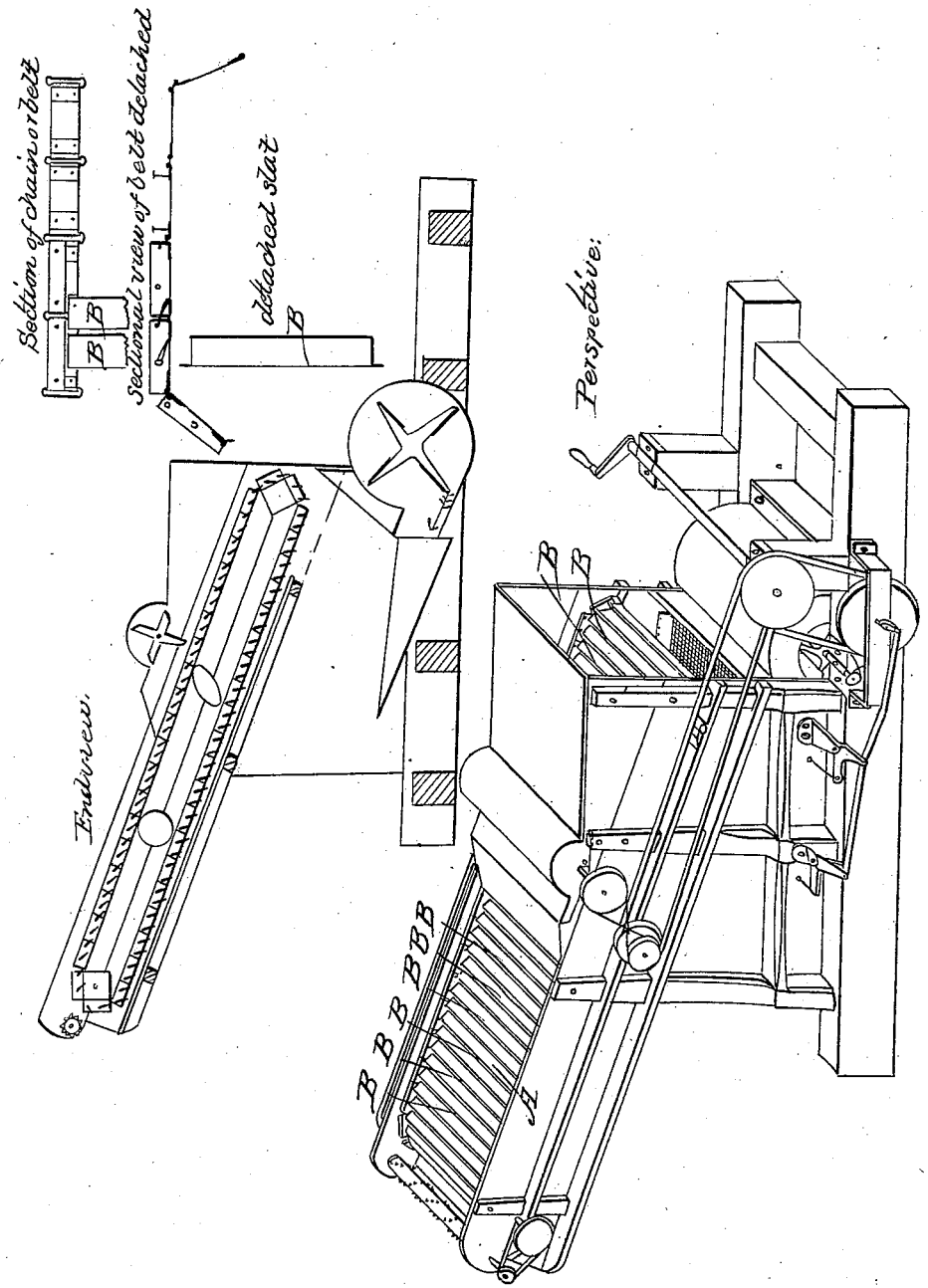

UNITED STATES PATENT OFFICE.

RUSSELL TOMLINSON, OF JACKSON, MICHIGAN.

STRAW-CARRIER.

Specification of Letters Patent No. 4,594, dated June 27, 1846.

*To all whom it may concern:*

Be it known that I, RUSSELL TOMLINSON, of Jackson, in the county of Jackson and State of Michigan, have invented a new and useful Improvement on Straw Carriers and Separators for Threshing - Machines; and I do hereby declare that the following is a full and exact description of the construction and operation of the same, reference being had to the annexed drawings, making a part of this specification.

The nature of my invention and what I claim to be new consists in the application of hinges to the slats (B,) of the straw carrier (A,), instead of being fastened thereto as in other machines, by which means the slats are open when on the under side of the straw carrier, thereby permitting all straw, and heading, which falls through the aperture between the slats above, to fall underneath, instead, of either, remaining in the straw carrier, and thereby obstructing the operation of the machine; or, of being again mixed with the threshed grain.

I construct my straw carrier and separator in the following manner, viz.: The straw carrier is elevated as usual in other improved machines. The motive power is derived from the threshing machine by the aid of bands, or belts. The straw carrier passes at each end around a roller or drum. The slats are made of wood or any other material which will answer the purpose. They are two and one fourth inches wide, and when closed are one fourth of an inch asunder. Each slat is hung on hinges, one hinge at each end. When in motion, the slats on the upper side of the straw carrier presents a flat surface, being one fourth of an inch apart, but on passing the upper roller, or drum, they swing open, on the hinge and remain open while on the under side, but on coming to the lower roller they again close up present the flat surface.

The chain or belt is made of iron, leather, or any other material that will answer the purpose. It is made into links or loops of sufficient length to have two slots attached to each link, or loop.

When in operation, the wheat, and straw, are together thrown from the thresher upon the straw carrier. Here the wheat is separated from the straw, by passing through the aperture between the slats, while at the same time, the straw is carried off at the upper end of the machine. All straw and heading which falls between the narrow aperture on top (one fourth inch wide), is freely discharged underneath through the opening made by the slats swinging apart, instead of accumulating at the lower end of the straw carrier, which accumulation obstructs the operation of the machine very much.

What I claim as my invention, and desire to secure by Letters Patent is—

Hinging the slats where they are attached to the chain or belt of the straw carrier or separator, by which means, the slats are nearly closed, when on the upper side and open when on the under.

RUSSELL TOMLINSON.

Witnesses:
 N. H. JOY,
 JOSHUA SLAYTON.